No. 883,815.
PATENTED APR. 7, 1908.
O. L. LARSON.
SMUT MACHINE.
APPLICATION FILED JULY 13, 1907.
2 SHEETS—SHEET 1.
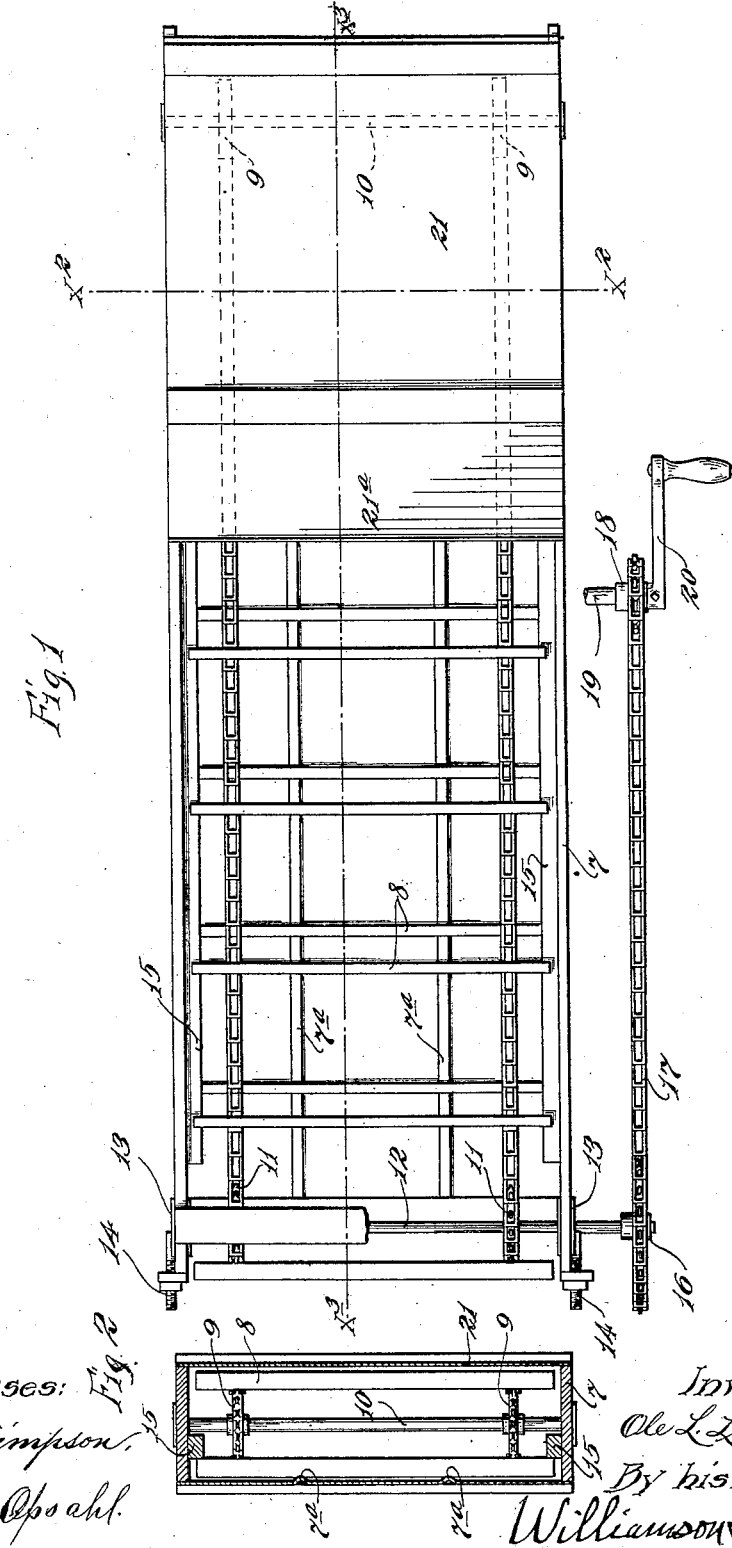
Witnesses:
L. L. Simpson.
A. H. Opsahl.
Inventor:
Ole L. Larson.
By his Attorneys
Williamson & Merchant No. 883,815. PATENTED APR. 7, 1908.
O. L. LARSON.
SMUT MACHINE.
APPLICATION FILED JULY 13, 1907.
2 SHEETS—SHEET 2.
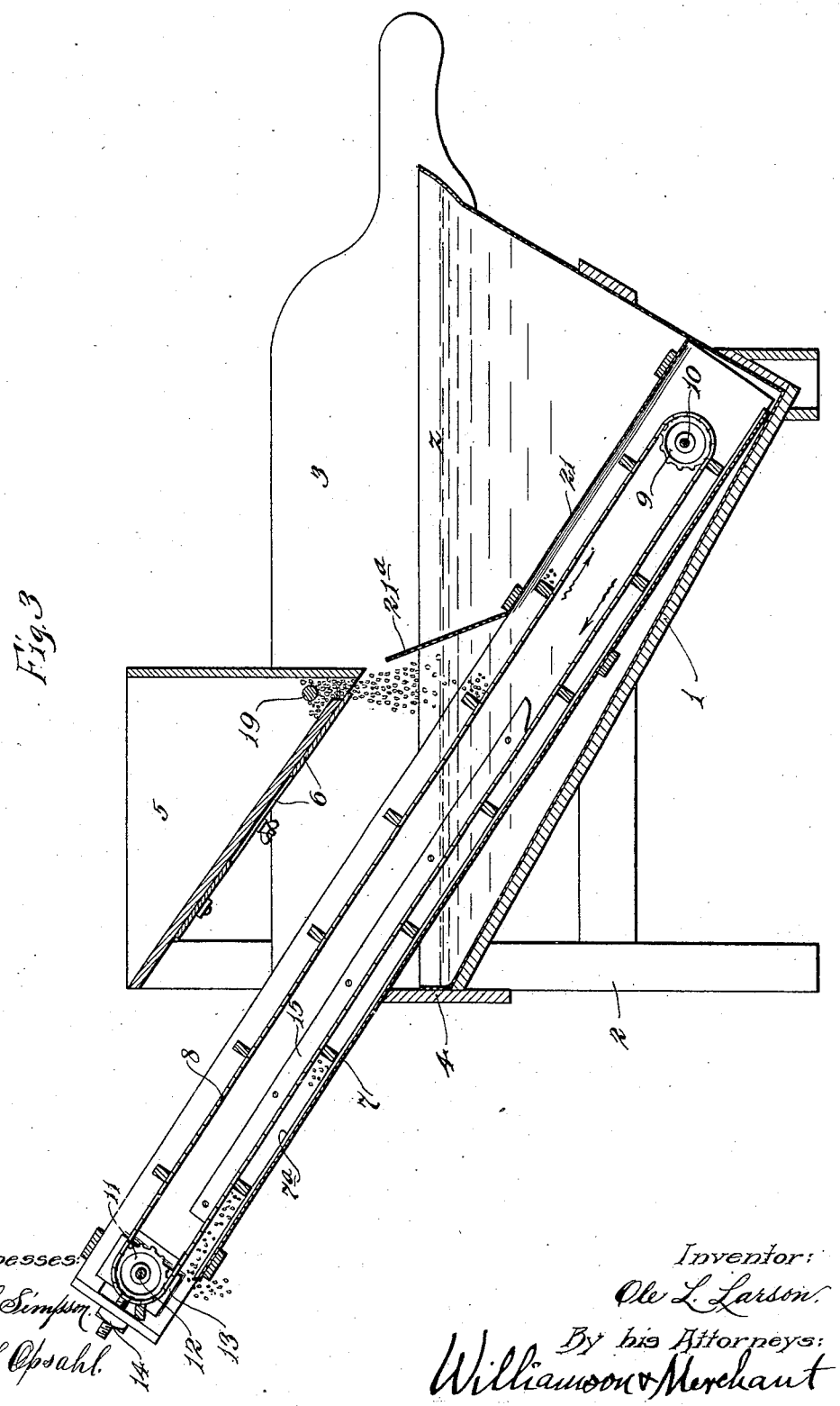
Witnesses:
L. L. Simpson
A. H. Opsahl
Inventor:
Ole L. Larson,
By his Attorneys:
Williamson & Merchant

UNITED STATES PATENT OFFICE.

OLE L. LARSON, OF MINNEAPOLIS, MINNESOTA.

SMUT-MACHINE.

No. 883,815.

Specification of Letters Patent.

Patented April 7, 1908.

Application filed July 13, 1907. Serial No. 383,630.

*To all whom it may concern:*

Be it known that I, OLE L. LARSON, a citizen of the United States, residing at Minneapolis, in the county of Hennepin and State of Minnesota, have invented certain new and useful Improvements in Smut - Machines; and I do hereby declare the following to be a full, clear, and exact description of the invention, such as will enable others skilled in the art to which it appertains to make and use the same.

My invention relates to smut machines.

In its general design the machine is similar to the one disclosed in my prior patent 850,378, of date April 16th, 1907. As in my said prior machine, the purpose is to treat smutty grain with a solution of formaldehyde or other germ - destroying liquid. My prior machine was especially well adapted for the treatment of smutty wheat or other grain of greater specific gravity than the liquid, but did not work well for the treatment of oats or other light grains of less specific gravity than the liquid.

My present invention has for its object to provide a machine which will work well in treating oats or other light grains.

To this end, my invention consists of the novel devices and combinations of devices hereinafter described and defined in the claims.

In the accompanying drawings, wherein like notations indicate like parts throughout the several views; Figure 1 is a plan view of my improved machine, with some parts broken away; Fig. 2 is a section on the line $x^2$ $x^2$ of Fig. 1; and Fig. 3 is a vertical longitudinal section on the line $x^3$ $x^3$ of Fig. 1.

The numeral 1 represents a hopper - like tank secured to a suitable framework 2 for holding the germ-destroying liquid Z. The frame 2 is provided with side-boards 3 forming upward extensions to the side walls of the tank 1. The frame 2 is also provided with a cross board 4 at one end which rises to a height above the level of the liquid in the tank 1. On the frame 2, at the end thereof adjacent to the board 4, is mounted a feed hopper 5, the outlet opening or throat of which is controlled by an adjustable slide 6, for controlling the feed of the smutty grain which is to be treated by the liquid in the tank 1. Within the tank 1, in an inclined position and passing out from the tank below the hopper 5, is mounted an open-ended trunk 7, provided with an endless conveyer 8 of the chain and slat type. The chains of the conveyer 8 run over sprockets 9 on shaft 10 suitably mounted near the lower end of the trunk 7, and over sprockets 11 fixed to shaft 12 near the upper end of the trunk 7, which shaft 12 is journaled in sliding boxes 13 mounted in the side-boards of the trunk and subject to draw bolts 14 for setting the conveyer under proper tension. The floor of the trunk 7 is provided with a pair of raised corrugations $7^a$, spaced apart from each other and running lengthwise thereof, upon which the cross slats of the under-running fold of the conveyer 8 travel as they move upward toward the delivery end of the elevator; and to the side-boards of the trunk 7 are fixed guides 15 under which the projecting ends of the slats of the under-running fold of the conveyer move, and by which the slats of the conveyer are held down and made to run upon the corrugations $7^a$, or close enough to the floor of the trunk 7 to prevent the escape of the grain but with sufficient clearance to permit the liquid to flow backward and downward along the trunk and into the tank 1. The upper shaft 12 projects outward, at one end, beyond the frame of the machine, and is provided with a sprocket 16 connected by a chain 17 to a sprocket 18 on driving shaft 19 suitably mounted in the framework of the machine and shown as provided with a hand crank 20. As shown, the driving shaft 19 extends through the feed hopper close to the outlet or feed throat of the same and assists in the feeding action of the grain.

All that portion of the trunk 7 which projects above the level of the liquid in the tank 1 is open on its face, or without any top covering; but a considerable part of all that portion of the trunk 7 which is submerged within the liquid Z is covered or closed on its face by a guard board 21. This guard board 21 extends sufficiently close to the lower end of the trunk 7 to afford a grain tight joint between the trunk and the wall of the tank at the foot of the trunk. The guard board 21 is provided with an upward extension $21^a$ standing at an angle to the main body of the guard board and the face of the trunk 7 and reaching nearly to a junction with the right hand wall of the feed hopper 5, so that the grain delivery from the feed hopper is to the left of said extension $21^a$, as shown in Fig. 3 of the drawings. The parts marked with the numerals 7 to 16 inclusive and with the numerals 21 and 21ª together constitute an elevator which is bodily removable from the tank 1 and the frame of the machine, but which, when in working position therein, will rest by gravity in the position shown in Fig. 3 of the drawing.

Assuming the conveyer 8 to be in motion, the hopper 5 to be loaded with smutty oats or other grain of less specific gravity than the liquid Z, and the feed outlet of the hopper to be properly graduated by the slide 6, then the action on the grain will be as follows: The grain will drop by gravity into the water to the left of the guard board extension 21ª, and thence into the trunk 7 far enough to be caught by the slats on the upper-running fold of the conveyer 8, and be carried thereby down toward the lowermost end of the said trunk 7, where it will be held from rising out of the liquid by the guard board 21. Hence, the said grain will be kept submerged all the time it is going down under the guard board 21 until it reaches the foot of the trunk 7 where it will tend to accumulate, and will then be caught by the slats on the under-running fold of the conveyer 8 and be carried up thereby, along the floor of the trunk 7, and delivered over the upper end of the same.

If the guard 21 was not present, the grain of less specific gravity than the liquid Z, as soon as its falling movement was checked by the liquid, would rise through the same and float on the top thereof, thereby getting into such a position that the slats of the conveyer 8 could not engage and remove the same from the tank; and moreover, such grain would not be submerged in the liquid for a sufficient length of time to get the proper results from the same. By the embodiment of the guard 21, with the other parts of the elevator herein shown, the machine is rendered efficient for the treatment of oats or other light grain. Of course, it will be understood that the guard 21—21ª instead of being applied directly to the trunk 7 of the elevator, might be otherwise supported within the tank 1 as long as it be properly located to serve the guarding function in respect to the grain. For example, it might be fixed to the side walls of the tank and the lower end of the trunk be fitted under the same, with close enough joints to prevent the escape of the grain therethrough under the buoying action thereon of the liquid. The same remark applies to the walls of the submerged portions of the trunk of the elevator, and the joints which they make with the walls of the tank at the lower end of the elevator. Otherwise stated, these joints may be sufficiently open to permit a free circulation of the liquid, but should be sufficiently close to prevent the rising of the grain therethrough. It must also be understood that the elevator might be of any suitable construction, as long as it was capable of coöperation with the guard 21, in the manner and for the purposes hereinbefore described.

Respecting the upward extension 21ª of the guard 21, it should be noted that it rises to a point above the level of the liquid Z in the tank 1, and is so related to the line of the grain's feed, as it drops from the hopper 5 and to the endless conveyer 8, that it will prevent the grain, which floats on the top of the liquid, moving to the right of the said extension; and hence, it follows, that whatever grain does float at the left of the said extension 21ª, will remain in position to be engaged by the slats of the conveyer 8 and be dragged down under the liquid and be taken to the lower end of the trunk 7 beneath the main body of the guard 21.

What I claim is:—

1. In a machine of the class described, the combination with a suitable tank, for containing a germ destroying liquid, of a grain supplying device, an elevator partially submerged within the liquid in said tank, and a guard covering substantially the whole of the submerged part of said elevator but having an angular upward extension protruding beyond the liquid level, at a short distance from the adjacent face of the elevator, with the said parts so arranged that the grain from said supply device is dropped into the liquid between said guard extension and the adjacent downward moving elements of the elevator, whereby grain of less specific gravity will not be floated away by the liquid, but will be caught by the moving elements of the elevator, and be thereby forced under the guard and held subject to the liquid throughout the travel of the moving elements of the elevator therethrough, substantially as described.

2. In a machine of the class described, the combination with a tank for holding a germ destroying liquid, of a grain supplying device, a grain elevator composed of a suitable trunk having an endless conveyer, the upper fold of which runs downward, and the under fold of which runs upward, which elevator is partially submerged within the liquid in said tank, and the trunk of which elevator has grain-tight bottom and side walls and is provided with a grain-tight cover or guard composed of the parts 21 and 21ª arranged in respect to the grain supply device and the down running fold of the conveyer, as described, for coöperation therewith as set forth, whereby the said machine is adapted to the treatment of oats or other light grains of less specific gravity than the liquid.

In testimony whereof I affix my signature in presence of two witnesses.

OLE L. LARSON.

Witnesses:
JAS. F. WILLIAMSON,
H. D. KILGORE.